United States Patent
Lindahl

(10) Patent No.: US 12,372,399 B2
(45) Date of Patent: Jul. 29, 2025

(54) MULTILAYER COLOURIMETRIC INDICATOR

(71) Applicant: Intellego Technologies AB, Solna (SE)

(72) Inventor: Claes Lindahl, Solna (SE)

(73) Assignee: Intellego Technologies AB, Solna (SE)

( * ) Notice: Subject to any disclaimer, the term of this patent is extended or adjusted under 35 U.S.C. 154(b) by 277 days.

(21) Appl. No.: 18/043,439

(22) PCT Filed: Sep. 2, 2021

(86) PCT No.: PCT/EP2021/074269
§ 371 (c)(1),
(2) Date: Feb. 28, 2023

(87) PCT Pub. No.: WO2022/049194
PCT Pub. Date: Mar. 10, 2022

(65) Prior Publication Data
US 2023/0324223 A1    Oct. 12, 2023

(30) Foreign Application Priority Data
Sep. 2, 2020  (GB) ........................... 2013768

(51) Int. Cl.
*G01J 1/50* (2006.01)
*G01J 1/04* (2006.01)

(52) U.S. Cl.
CPC ............... *G01J 1/50* (2013.01); *G01J 1/0488* (2013.01)

(58) Field of Classification Search
CPC .................................. G01J 1/0488; G01J 1/50
See application file for complete search history.

(56) References Cited

U.S. PATENT DOCUMENTS

| | | |
|---|---|---|
| 4,212,535 A | 7/1980 | Makow et al. |
| 5,117,116 A | 5/1992 | Bannard et al. |
| 6,060,321 A | 5/2000 | Hovorka |
| 9,658,101 B1 | 5/2017 | Levine et al. |
| 2005/0285050 A1 | 12/2005 | Bruce |
| 2017/0191866 A1 | 7/2017 | Balooch et al. |
| 2020/0149960 A1 | 5/2020 | Foller et al. |
| 2021/0085811 A1* | 3/2021 | Gordon ............ C02F 1/32 |
| 2021/0156739 A1* | 5/2021 | Hu ............ A61B 5/6803 |
| 2022/0018711 A1 | 1/2022 | Wu |

FOREIGN PATENT DOCUMENTS

| | | |
|---|---|---|
| CN | 110470389 A | 11/2019 |
| EP | 0487792 A1 | 6/1992 |
| EP | 4317361 A1 | 2/2024 |

(Continued)

OTHER PUBLICATIONS

English translation for JP 2007-278904 A (Year: 2007).*

(Continued)

*Primary Examiner* — Mark R Gaworecki
(74) *Attorney, Agent, or Firm* — Myers Bigel, P.A.

(57) ABSTRACT

An apparatus 5 comprises a first layer 20 comprising a colourimetric indicator; and a second layer 30 provided on at least a portion 22 of the first layer 20, at least a portion of the second layer 30 being configured to block and/or absorb a radiation to which the indicator is sensitive or reactive and being configured to be substantially transparent to visible light.

16 Claims, 2 Drawing Sheets

(56) References Cited

FOREIGN PATENT DOCUMENTS

| JP | S6125295 B2 | 6/1986 | | |
|---|---|---|---|---|
| JP | H05107112 A | 4/1993 | | |
| JP | H0843197 A | 2/1996 | | |
| JP | 3024525 U | 5/1996 | | |
| JP | 2007278904 A | * | 10/2007 | |
| WO | 2010070290 A1 | 6/2010 | | |
| WO | WO-2020006377 A1 | * | 1/2020 | ................ G01J 1/50 |

OTHER PUBLICATIONS

International Search Report and the Written Opinion of the International Searching Authority corresponding to International Patent Application No. PCT/EP2021/074269 (11 pages) (mailed Jan. 7, 2022).

Office action with English translation corresponding to Japanese Application No. 2023-514499 (8 pages) (dated Feb. 12, 2025).

* cited by examiner

MULTILAYER COLOURIMETRIC INDICATOR

FIELD OF THE INVENTION

The present invention relates to a colourimetric indicator. In particular, but not exclusively, the invention relates to an apparatus improving visualisation of a colour change in in a colorimetric indicator.

BACKGROUND

Many products exist, that provide a visual indication (through a colour change) of exposure to a certain amount of a particular compound or radiation. Such products typically include one or more colourimetric indicator. For example, colourimetric indicators rely on the optical properties of reactive dyes or inks. These dyes can exist in at least two different chemical states, with each form of the dye absorbing light in a particular range of wavelength. When such a reactive dye existing in a first form is exposed to a given substance, it reacts with the substance via a reversible chemical reaction, thereby turning into a second form of the dye. As the second form of the dye absorbs light at a different wavelength, the chemical reaction provides a colour change which is visible by an observer. Colourimetric indicators may be configured to display reversible colour changes or irreversible colour changes, depending on their intended use, and the chemical substance, radiation or stimulus causing the colour change in the indicator. An example of a colourimetric indicator reactive to irradiation by ultraviolet radiation (UVR) is disclosed in WO 2010/070290 (Mills et al), the content of which is incorporated herein by reference in tis its entirety.

Exposing a surface to a given type of radiation may be either desired or deliberate, or may be undesirable or unintentional.

For example, whilst exposure of one's skin to direct sunlight may be desired and to some extent beneficial, overexposure to ultraviolet radiation is a recognised health hazard. Certain products exist, such as stickers or wristbands marketed under the name Smartsun™, which include a colourimetric indicator that displays a colour change after exposure to a certain type and/or quantity of UV radiation. This provides a user with a visual indication associated with exposure to a predetermined amount of UV radiation.

In another example related to sterilization and disinfection, products include a colorimetric indicator that displays a colour change after exposure to a certain amount of UVC radiation. This provides a user with a visual indication associated with exposure to UVC radiation. UVC irradiation is a known technique for and disinfecting and sterilizing surfaces, for example in a medical environment or in the foodstuff industry.

Other products rely on colourimetric indicators that exhibit a colour change when exposed to a particular compound or chemical substance, such as carbon dioxide, oxygen, ammonia, or the like. These can be useful, for example, in the food industry.

Whilst products incorporating a colourimetric indicator provide a useful indication of potential exposure to a given type of radiation, stimulus, or chemical substance, a challenge with these systems is that visual evaluation of a given colour change can be difficult and may be subject to interpretation, which can be potentially counter-productive or even dangerous when subsequent decisions are based on such evaluation. Typically, a user will only notice a change in the colour of the indicator when a significant colour change has occurred. For a UV indicator, this may correspond to a relatively high exposure dose. In particular, if the indicator is used in a hospital environment, it may be useful to visually detect a relatively low exposure dose (e.g. in the region of 6 mJ/cm$^2$ or less) on the indicator.

Certain colourimetric indicators include one or more reference portions which are aimed at representing the target colour of the indicator colour after exposure to a predetermined dose of irradiation. Examples of such systems include US 2017/0191866 A1 (Balooch et al), EP0487792A1 (Pugh et al), and U.S. Pat. No. 5,117,116A (Bannard et al), which disclose colourimetric indicator systems which include one or more reference areas corresponding to respective colours of the radiation-sensitive indicator when exposed to different predetermined quantities of radiation.

These systems suffer from a number of disadvantages. For example, the reference regions are coloured or printed using a non-reactive, different, composition from the indicator itself, and therefore cannot represent a perfect colour match with the colour of the indicator, whether before exposure or after exposure to a predetermined dose of radiation. In addition, the colour of the reference ink may vary from batch to batch and/or may fade or be otherwise altered through aging or exposure to the environment, e.g. light, temperature, humidity, etc. As such, these systems suffer from a lack of reliability in the intended colour match between the reference portion and the indicator in a given state (e.g. unexposed, or post-exposure).

Other documents, including US2020149960A1 (Foller et al) and U.S. Pat. No. 9,658,101B1 (Levine et al) disclose indicators having a generally multilayer arrangement with no inclusion of any reference portions.

It is an object of the invention to address and/or mitigate one or more problems associated with the prior art.

SUMMARY

According to a first aspect there is provided an apparatus comprising:
  a first layer comprising a colourimetric indicator; and
  a second layer provided on at least a portion of the first layer, at least a portion of the second layer being configured to block and/or absorb a radiation to which the indicator is sensitive or reactive and being configured to be substantially transparent to visible light.

The portion(s) of the second layer being configured to block and/or absorb a radiation to which the indicator is sensitive and being configured to be substantially transparent to visible light, may be termed an active portion or active portions.

The second layer may comprise at least one passive portion. The passive portion(s) may not block and/or may not absorb a radiation to which the indicator is sensitive. The passive portion(s) may be substantially transparent to visible light and/or to a radiation to which the indicator is sensitive. Typically, the passive portion(s) may be substantially transparent both to visible light and to a radiation to which the indicator is sensitive.

The active portion(s) of the second layer may be transparent to visible light. Advantageously, the active portion(s) of the second layer may not alter the colour of the indicator under visible light. By such provision, the presence of the second layer may not affect the colour of the indicator as observed and/or perceived by a user viewing the indicator and/or the first layer through the second layer. Put differently, the colour of the indicator perceived by a user may be substantially identical whether seen directly by looking at the first layer, or seen indirectly by viewing the indicator and/or first layer through the active portion(s) of the second layer.

The second layer, e.g. active portion thereof, may be transparent to radiations in the region of about 400-800 nm, e.g. about 400-740 nm.

Advantageously, the presence of an active portion being configured to block and/or absorb a radiation to which the indicator is sensitive and being configured to be substantially transparent to visible light, may provide a reliable reference portion in the apparatus. In particular, the area of the apparatus comprising the active portion may represent or may define a reference portion. Because the active portion is configured to block and/or absorb a radiation to which the indicator is sensitive, the indicator will not change colour in the region(s) covered by the active portion(s) when exposed to a radiation that would normally cause a colour change.

The radiation to which the indicator is sensitive will be herein termed a "trigger radiation".

The indicator and/or first layer may comprise a first portion and a second portion. The first portion may not be covered by the second layer, or may be covered by a passive portion of the second layer. The second portion may be covered by an active portion of the second layer.

Advantageously, before exposure to a trigger radiation, the first portion and the second portion of the indicator may display the same colour. As such, the reference portion may provide a perfect colour match with an adjacent portion of the apparatus, e.g. with a portion of the indicator in which the indicator is not covered with an active portion of the second layer, regardless or any regardless of any potential variation between batches or any minor change in the original (non-exposed) colour of the indicator. In contrast, reference portions of the prior art cannot provide a perfect match because they typically involve using a non-reactive dye, pigment or ink which is different from the indicator itself.

Advantageously, because the colour of the first portion and of the second portion of the indicator in the first layer are a perfect match before exposure to a trigger radiation, the present apparatus allows a user to detect a visible colour change after exposure to a low level or dose of trigger radiation, e.g. after exposure to a level or dose of trigger radiation which is lower than the minimum dose at which a user would normally be able to detect a colour change in the indicator.

Advantageously, a user may be able to detect a colour change in the indicator, e.g. in the first portion thereof, after exposure to a dose of the trigger radiation of about 8 mJ/cm$^2$, e.g. of about 6 mJ/cm$^2$, e.g. of about 5 mJ/cm$^2$.

The active portion of the second layer may comprise a radiation absorbing component, e.g. a radiation absorber, configured to absorb the trigger radiation. It will be understood that the radiation absorber selected in the active portion may depend on the specific colourimetric indicator used in the first layer. For example, the radiation absorber may be a UV radiation absorber, e.g. a UVC absorber. The radiation absorber may comprise one or more compounds selected from the group consisting of benzophenones, hydroxybenzophenones, hydroxyphenylbenzotriazoles, phenolic benzotriazoles, enzotriazoles, hydroxyphenyltriazines, and oxanilides. The radiation absorber may comprise a benzophenone and/or a phenolic benzotriazole.

The second layer may comprise or may be a coating. Typically, when the second layer comprises a coating, the second layer may be provided only on a portion, e.g. second portion, of the first layer. The second layer may be, may define, or may coincide with the active portion. Thus, the first portion of the first layer may not be covered by the coating, and the second portion of the first layer may be covered by the coating.

The coating may comprise or may be provided in the form of a varnish.

Typically, the first layer, e.g. the indicator layer, may be a solvent-based composition.

The second layer, e.g. coating or varnish, may be a solvent-based coating composition. By such provision, the coating may have improved compatibility with the first layer, e.g. with the indicator layer.

The coating may comprise a polymer binder and a solvent.

The radiation absorbing component may be a component of the coating, e.g. may form part of the binder.

The radiation absorbing component may be a radiation absorber additive. Thus, the coating may comprise a polymer binder, a solvent, and a radiation absorber. The radiation absorber may comprise one or more compounds selected from the group consisting of benzophenones, hydroxybenzophenones, hydroxyphenylbenzotriazoles, phenolic benzotriazoles, enzotriazoles, hydroxyphenyltriazines, and oxanilides. The radiation absorber may comprise a benzophenone and/or a phenolic benzotriazole.

The coating may comprise a radiation absorber configured to absorb the trigger radiation. It will be understood that the radiation absorber selected in the coating may depend on the specific colourimetric indicator used in the first layer.

In some embodiments, the coating may comprise or may be a composition as marketed by Fujifilm as APR VA401 or as Fujifilm Sericol PY433 EL Overprint, or as marketed by Marabu as Mara® Mold MPC 910. The second layer may have a relatively high viscosity. Advantageously, the inventors have surprisingly found that a higher viscosity increases the ability of the second layer to block and/or absorb the radiation, e.g. UV. This may allow the second layer to block and/or absorb a/the radiation without the inclusion of a radiation absorber additive.

The second layer may comprise or may be a laminated layer. The second layer may be laminated on the first layer, e.g. on the indicator layer. The second layer may be a self-supporting layer, e.g. a film.

An adhesive may be provided between the second layer and the first layer. The second layer may comprise an/the adhesive layer and may be configured to attach to the first layer.

The second layer may be devoid of an adhesive. The second layer may be configured to be laminated, e.g. heat-laminated or pressure-laminated, on the first layer.

Typically, when the second layer comprises a self-supporting layer and/or a laminated layer, the second layer may be provided only on a portion, e.g. second portion, of the first layer, or may be provided both on at least part of the first portion and on the second portion of the first layer.

When the second (self-supported) layer is provided only on a portion, e.g. second portion, of the first layer, the second layer may define, or may coincide with the active portion. Thus, the first portion of the first layer may not be covered by the second (self-supported) layer.

When the second (self-supported) layer is provided both on at least part of the first portion and on the second portion of the first layer, the second layer may comprise a first portion and a second portion.

The first portion of the second (self-supported) layer may comprise or may define the passive portion of the second layer. The first or passive portion may be substantially transparent to visible light and to a radiation to which the indicator is reactive, e.g. the trigger radiation.

The second portion of the second (self-supported) layer may comprise or may define the active portion of the second layer. The second or active portion may be substantially transparent to visible light, but may be configured to block and/or absorb a radiation to which the indicator is reactive, e.g. the trigger radiation.

The second (self-supported) layer may comprise a polymer. Typically, the coating may comprise a polymer binder and a/the radiation absorber.

The active portion of the second (self-supported) layer may comprise a radiation absorber configured to absorb the trigger radiation. It will be understood that the radiation absorber selected in the active portion may depend on the specific colourimetric indicator used in the first layer.

The first layer, e.g. the indicator layer, may be provided on a substrate.

The substrate may comprise a self-supporting layer. The substrate may comprise a film, sheet, or the like.

The first layer may be provided on the substrate. The substrate may be provided on a lower side of the apparatus, in use.

The second layer may be provided on the first layer or portion thereof. The second layer may be provided on an upper side of the apparatus, in use.

The apparatus may be or may be provided as an article, e.g. a wearable article such as a band, e.g. a wristband, a patch, a sticker, or the like.

The first layer may have a thickness above a predetermined level. The first layer may have a thickness of at least 0.1 mm. The inventors have found that, surprisingly, when the first layer has a thickness above about 0.1 mm, the presence of a second layer may be less easily detectable visually before exposure to the trigger radiation.

The colourimetric indicator may be capable of exhibiting a colour change in response to exposure to UV radiation, e.g. to UVA, UVB and/or UVC radiation. The trigger radiation may be selected from the group consisting of UVA, UVB, UVC, or combinations thereof. The colourimetric indicator may be or may comprise a UV indicator. The colourimetric indicator may be substantially as described in WO 2010/070290 (Mills et al), the content of which is incorporated herein by reference.

In an embodiment, the colourimetric indicator may be a UVA and/or UVB indicator. The trigger radiation may be UVA and/or UVB. The trigger radiation may be in the region of 280-400 nm. In such instance, the apparatus may be a sunburn indicator, which may be provided in the form of a wearable item such as a band, patch, sticker, tape, or the like.

In another embodiment, the colourimetric indicator may be a UVC indicator. The trigger radiation may be UVC. The trigger radiation may be in the region of 100-280 nm. In such instance, the apparatus may be a disinfection indicator and/or a sterilisation indicator.

The colourimetric indicator may have a first state associated with a first colour. The first state and/or first colour may be associated with an absence of colour change. For example, the first state and/or first colour may be associated with the absence of exposure of the indicator to the trigger radiation or to the exposure of the indicator to the trigger radiation below a predetermined and/or threshold activation level, e.g. below 0.1 mJ/cm$^2$, e.g. below 0.5 mJ/cm$^2$, e.g. below 1 mJ/cm$^2$.

The colourimetric indicator may have a second state associated with a second colour. The second state and/or second colour may be associated with a full or final colour change. For example, the second state and/or second colour may be associated with full exposure of the indicator to the trigger radiation or to the exposure of the indicator to the trigger radiation above a predetermined and/or upper activation level, e.g. above 0.1 mJ/cm$^2$, e.g. below 0.5 mJ/cm$^2$, e.g. below 1 mJ/cm$^2$.

The colourimetric indicator may have one or more intermediate states each associated with a corresponding intermediate colour. The one or more intermediate states and/or one or more intermediate colours may be or may comprise one or more states and/or colours between the first state and/or first colour and the second state and/or second colour. Each intermediate state and/or intermediate colour may be associated with a predetermined level or dose of exposure to the trigger radiation.

Each of the first state and/or first colour, intermediate state(s) and/or intermediate colour(s), and second state and/or second colour, may each correspond to or may each be associated with a predetermined level or dose of exposure to the trigger radiation.

The apparatus may further comprise at least one additional reference colour region. The at least one additional reference colour region may correspond to the first colour, the second colour, and any of the intermediate colours. By such provision, in use, a user or observer may be able to obtain further visual assessment by comparing the colour of the indicator or first layer (e.g. first region thereof) to the colour of the at least one additional reference colour region. In an embodiment, at least one additional reference colour region may be configured to substantially match the colour of the indicator in second (active) portion. By such provision, the additional reference colour region may provide a further reference region in addition to the reference region defined by the second portion of the apparatus and/or the active portion of the second layer.

BRIEF DESCRIPTION OF DRAWINGS

Embodiments of the present disclosure will now be given by way of example only, and with reference to the accompanying drawings, which are.

DETAILED DESCRIPTION

Figure 1:
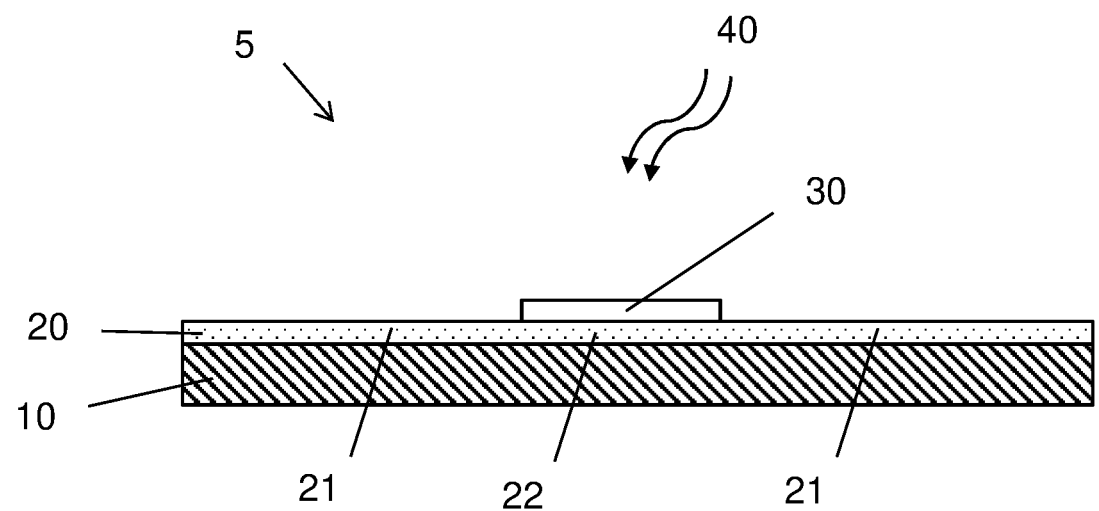
FIG. 1 a schematic view of an apparatus according to a first embodiment.

Referring to FIG. 1 there is shown an indicator apparatus, generally designated 5, according to a first embodiment.

The apparatus 5 includes a substrate 10. In this embodiment, the substrate 10 is in the form of a film.

The apparatus has a first layer 20 comprising a colourimetric indicator. The first layer 20 is provided on an upper side of the substrate 10, i.e., on a side of the substrate configured to face a source of radiation, in use.

A first portion 21, in this embodiment a peripheral portion 21, of the first layer 20, is exposed to the environment on its upper side, that is, on a side opposite the substrate 10. Thus, when the indicator in the first layer 20 is exposed to a trigger radiation, this will cause a colour change in the indicator of the first layer.

A second portion 22, in this embodiment a central portion 22, of the first layer is covered, by a second layer 30. In this embodiment the second layer 30 is a coating or varnish.

The coating 30 includes a radiation absorber which blocks or absorbs the trigger radiation to which the indicator is reactive. In this embodiment, the radiation absorber was a phenolic benzotriazole.

The second layer 30 is substantially transparent to visible light, allowing a user to observe the second portion 22 of the first layer through the second layer.

In use, before exposure of the apparatus 5 to a source of irradiation 40, the colour of the first portion 21 in the first layer 20 which is free of coating 30 and of the second portion 22 covered by the coating 30 are a perfect match to an observer, since the entire first layer 20 includes the same indicator.

Following exposure of the apparatus to radiation 40, the indicator which is not covered by the coating 30 reacts in the first portion 21 of the first layer 20 and changes colour as a result. The second portion 22 thus acts as a reference portion, and allows detection of a colour change in the first portion 21 after exposure to a low level or dose of trigger radiation 40, e.g. after exposure to a level or dose of trigger radiation 40 which is lower than the minimum dose at which a user would normally be able to detect a colour change in the indicator.

Figure 2:
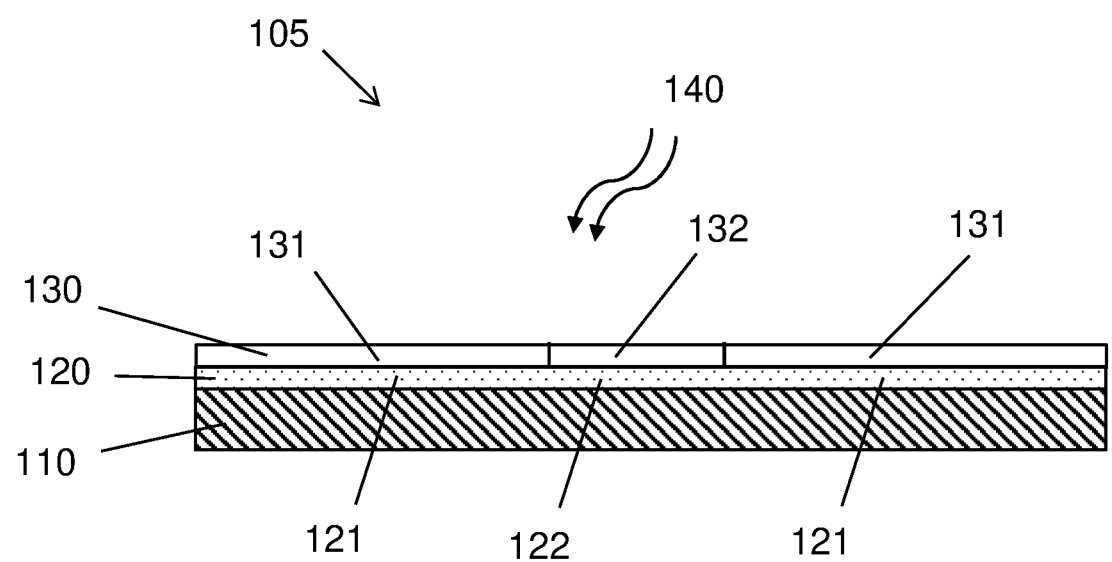
FIG. 2 a schematic view of an apparatus according to a second embodiment.

Referring to FIG. 2 there is shown an indicator apparatus, generally designated 105, according to a second embodiment. The indicator apparatus 105 is generally similar to the indicator apparatus 5 of FIG. 1, like parts denoted by like numerals, incremented by '100'.

In this embodiment, the second layer 130 is a self-supported layer which is laminated on top of the first layer 120. The second layer has a first, outer, portion 131 and a second, inner, portion 132.

The first portion 131 of the second layer 130 defines a passive portion of the second layer 130, and is substantially transparent to visible light and to the trigger radiation 140 to which the indicator in the first layer 120 is sensitive. The, thus first portion does not affect how the first layer 120 reacts to a trigger radiation 140.

The second portion 132 of the second layer 130 defines an active portion of the second layer 130. The active portion 132 is substantially transparent to visible light, but includes a radiation absorber which absorbs or blocks the trigger radiation 140 to which the indicator is sensitive.

In use, before exposure of the apparatus 105 to a source of irradiation 140, the colour of the first portion 121 in the first layer 120 which is covered by the passive portion 131 of second layer 130 and of the second portion 122 which is covered by the active portion 132 or the second layer 130 are a perfect match to an observer, since the entire first layer 120 includes the same indicator.

Following exposure of the apparatus 105 to radiation 140, the indicator which is covered by the passive portion 131 of the second layer 130 reacts in the first portion 121 of the first layer 120 and changes colour as a result. The second portion 122 thus acts as a reference portion, and allows detection of a colour change in the first portion 121 after exposure to a low level or dose of trigger radiation 140, e.g. after exposure to a level or dose of trigger radiation 140 which is lower than the minimum dose at which a user would normally be able to detect a colour change in the indicator.

Figure 3:
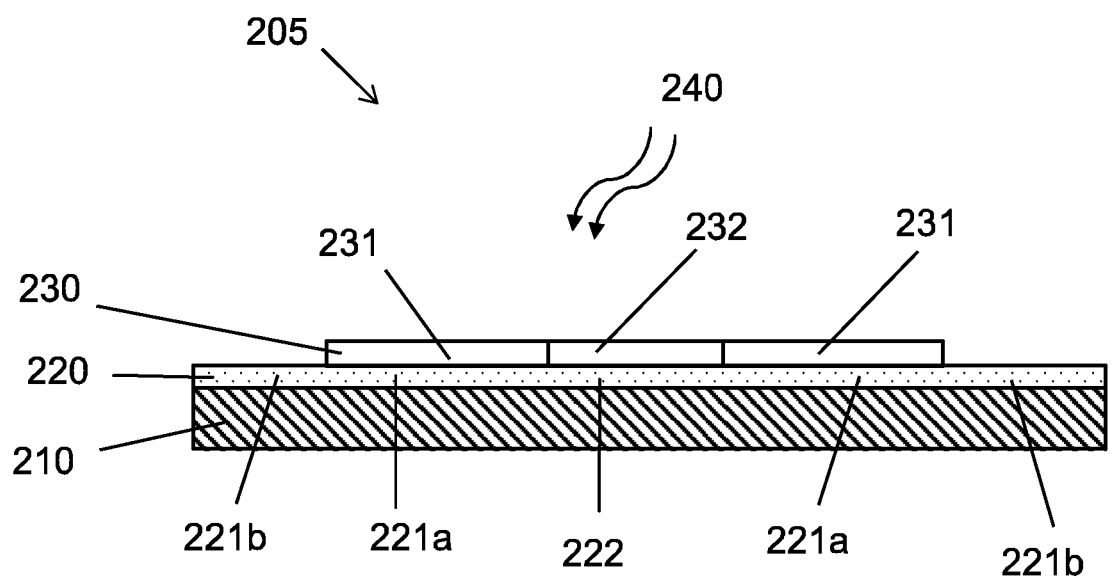
FIG. 3 a schematic view of an apparatus according to a third embodiment.

FIG. 3 shows a third embodiment of an indicator apparatus, generally designated 205. The indicator apparatus 205 is generally similar to the indicator apparatus 105 of FIG. 2, like parts denoted by like numerals, incremented by '100'.

In this embodiment, the second layer 230 is also a self-supported layer which is laminated on top of the first layer 220. However, in this embodiment, the second layer 230 has a first, outer, portion 231 which only covers part of the first layer 220.

As such the first portion 221 of the first layer 220 has a covered region 221a which is covered by the passive portion 231 of the second layer, and an uncovered region 221b. Because the passive portion 231 of the second layer 230 is substantially transparent to visible light and to the trigger radiation 240 to which the indicator in the first layer 220 is sensitive, the first portion 221 of the first layer 220 will react to irradiation 240 in the same manner in its covered region 221a and in its uncovered region 221b.

Figure 4:
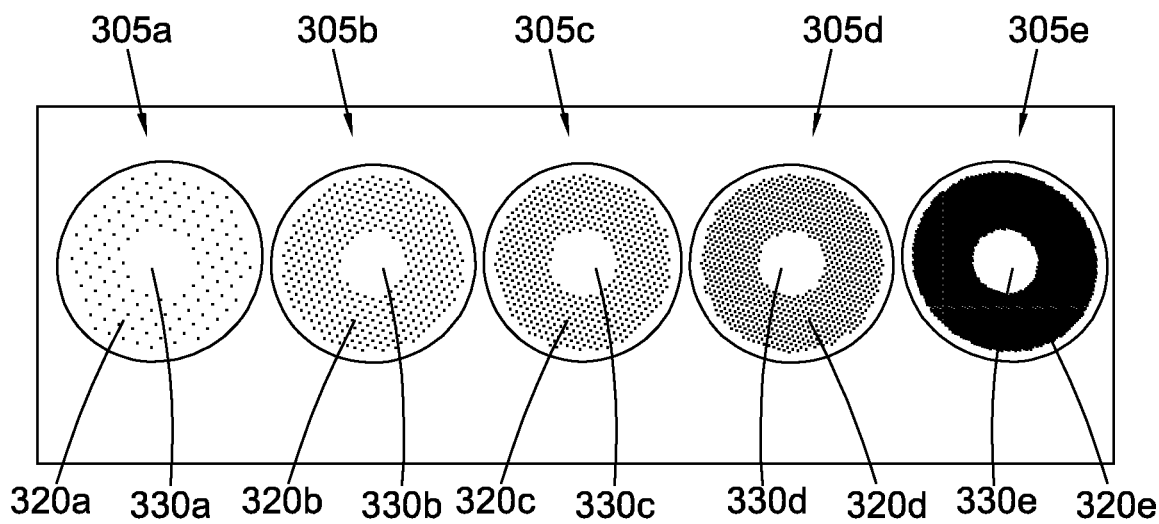
FIG. 4 images of an apparatus of FIG. 1, when exposed to different doses of irradiation.

Referring to FIG. 4, there is shown an image of an apparatus 305 as generally described in FIG. 1, when exposed to different doses of irradiation. In this embodiment, the apparatus 305 includes a UVC indicator in its first layer 320, and a central portion of the first layer is covered by a coating 330 which includes a UVC radiation absorber. In this embodiment, the UVC indicator contained Thymol Blue as pH indicator, NaOH, diphenyliodonium chloride (DPIC) as photo-acid generator, and Poly(vinyl butyral) as a binder.

The coating was Fujifilm APR VA401.

In this embodiment each of the five apparatuses 305a, 305b, 305c, 305d, 305e was exposure to a respective dose of UVC radiation, namely 2, 4, 6, 8, and 10 mJ/cm$^2$, respectively.

It can be seen from samples 305a and 305b that an irradiation dose of 2 or 4 mJ/cm$^2$ was not sufficient to trigger a visible change in the first (indicator) layer 320a and 320b, respectively.

However, sample 305c shows that a visible change in colour can be detected visually in the first portion of the first layer 320c when exposure to a UVC dose of 6 mJ/cm$^2$. The central portion of the first layer 320c is coated with second layer 330c which contains a UVC absorber, and therefore acts as a reference portion which maintains the colour of the indicator in a non-exposed state. As a result, the change of colour in the first layer 320c in the portion adjacent the second (central) layer 330c is much more easily detectable by an observer, which might not otherwise be able to detect reliably and confidently that a change of colour had taken place after exposure at 6 mJ/cm$^2$.

Samples 305d and 305e confirm a sharper change of colour in the indicator of the first layer 320d 320e, after exposure to 8 mJ/cm$^2$ and 10 mJ/cm$^2$, respectively.

It will be appreciated that the described embodiments are not meant to limit the scope of the present invention, and the present invention may be implemented using variations of the described examples.

The invention claimed is:
1. An apparatus comprising:
a first layer comprising a colourimetric indicator, wherein the colourimetric indicator comprises a UV indicator; and
a second layer provided on at least a portion of the first layer,
wherein the first layer comprises a first portion and a second portion adjacent the first portion,
wherein at least a portion of the second layer defines an active portion being configured to block and/or absorb a radiation to which the indicator is sensitive or reactive so as to prevent a colour change in the second portion of the first layer upon exposure to said radiation, the active portion being configured to be substantially transparent to visible light, wherein the second portion of the first layer is covered by the active portion of the second layer, and wherein the first portion of the first layer is not covered by the second layer, or is covered by a passive portion of the second layer which is substantially transparent both to visible light and to a radiation to which the indicator is sensitive.

2. An apparatus according to claim 1, wherein the second layer comprises at least one passive portion, wherein the at least one passive portion is substantially transparent both to visible light and to a radiation to which the indicator is sensitive.

3. An apparatus according to claim 1, wherein the active portion(s) of the second layer is transparent to radiations in the region of about 400-800 nm.

4. An apparatus according to claim 1, wherein the active portion of the second layer comprises a radiation absorber configured to absorb said radiation.

5. An apparatus according to claim 1, wherein the second layer comprises a coating.

6. An apparatus according to claim 5, wherein the second layer is provided only on the second portion of the first layer.

7. An apparatus according to claim 5, wherein the coating is provided in the form of a varnish.

8. An apparatus according to claim 1, wherein the first layer or the second layer comprises a solvent-based composition.

9. An apparatus according to claim 1, wherein the second layer comprises a film.

10. An apparatus according to claim 9, wherein the second layer is laminated on the first layer, or wherein an adhesive is provided between the second layer and the first layer.

11. An apparatus according to claim 9, wherein the second layer is provided only on the second portion of the first layer, and wherein the second layer defines or coincides with the active portion.

12. An apparatus according to claim 9, wherein the second layer is provided both on at least part of the first portion and on the second portion of the first layer, and the second layer comprises a corresponding first portion and second portion, and wherein the first portion of the second layer defines the passive portion, and wherein the second portion of the second layer defines the active portion.

13. An apparatus according to claim 1, wherein the first layer has a thickness of at least 0.1 mm.

14. An apparatus according to claim 1, wherein the apparatus is provided as a wearable article.

15. An apparatus according to claim 1, wherein the colourimetric indicator is a UVA and/or a UVB indicator, or wherein the colourimetric indicator is a UVC indicator.

16. An apparatus according to claim 1, wherein the apparatus further comprises at least one additional reference colour region.

* * * * *

UNITED STATES PATENT AND TRADEMARK OFFICE
CERTIFICATE OF CORRECTION

| | | |
|---|---|---|
| PATENT NO. | : 12,372,399 B2 | Page 1 of 1 |
| APPLICATION NO. | : 18/043439 | |
| DATED | : July 29, 2025 | |
| INVENTOR(S) | : Claes Lindahl | |

It is certified that error appears in the above-identified patent and that said Letters Patent is hereby corrected as shown below:

In the Specification

Column 7, Line 2: Please correct "layer is" to read --layer 20 is--

Signed and Sealed this
Tenth Day of February, 2026

John A. Squires
*Director of the United States Patent and Trademark Office*